Nov. 10, 1936.   F. J. T. BARNES   2,060,014
COOLING DEVICE FOR LIQUIDS
Filed Dec. 12, 1934
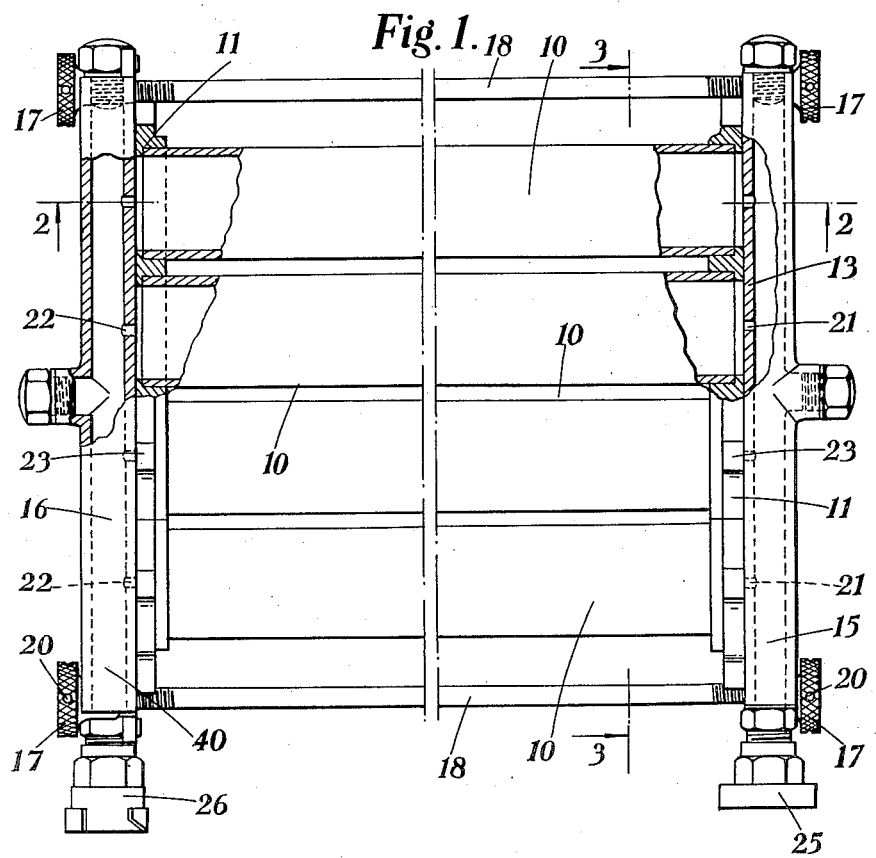
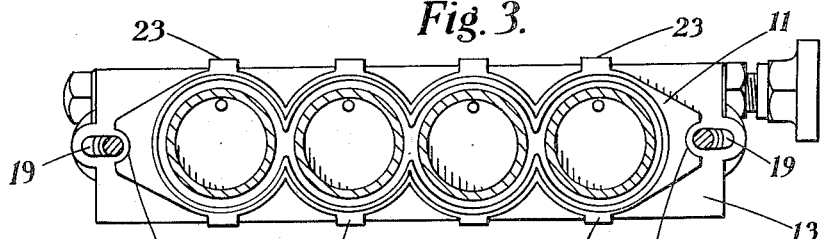
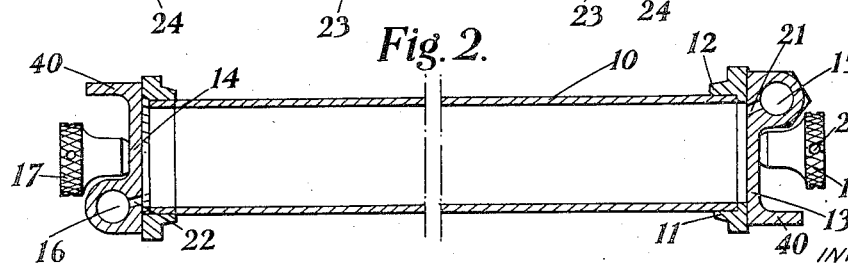
INVENTOR
FREDERICK J. T. BARNES
BY Stone, Boyden & Mack,
ATTORNEYS Patented Nov. 10, 1936

2,060,014

UNITED STATES PATENT OFFICE 2,060,014

COOLING DEVICE FOR LIQUIDS

Frederick John Trevallon Barnes, Brisbane, Australia

Application December 12, 1934, Serial No. 757,230
In Great Britain December 11, 1933

10 Claims. (Cl. 257—248)

This invention relates to a cooling device for liquids (for example beer or other beverages), and more particularly to a cooling coil adapted to be subjected in a container to the action of a cooling medium.

An object of the invention is to provide a cooling coil which may be more easily dismantled and cleaned than is the case with known arrangements.

Apparatus for cooling beverages, according to the present invention, comprises, in combination, a plurality of tubes through which liquid can flow, end-plates having conduits to communicate with the said tubes, and detachable clamping means for retaining the said end-plates in fluid-tight contact with the tubes. The tubes are preferably of glass and are separated from the end-plates by gaskets (for example of rubber).

According to another feature of the invention, the gaskets are formed with projections extending laterally beyond the said end-plates so as to form feet for supporting the apparatus.

Other features of the invention will appear hereinafter.

Specific embodiments of the present invention will now be described, by way of example, with reference to the accompanying drawing in which:—

Figure 1 is a plan, partly in section, of one form of the apparatus according to the invention, Figures 2 and 3 are sectional elevations, taken along the line 2—2 and along the line 3—3 respectively of Figure 1.

As shown in the drawing, four glass tubes 10 are supported at each end in rubber gaskets 11 formed with flanges 12 so as to make a spigot connection with the tubes 10. End-plates 13 and 14, formed integrally with an inlet conduit 15 and an outlet conduit 16 respectively are clamped on to the gaskets 11 by nuts 17 engaging the ends of screw-threaded rods 18 which pass through slots 19 formed at each end of the end-plates. Strengthening flanges 40 are formed integrally with the end-plates 13 and 14. The nuts 17 are formed with diametral holes 20 for engagement with a tommy-bar (not shown). Holes 21 and 22 are formed respectively in the end-plates 13 and 14 to connect the inlet conduit 15 and the outlet 16 with the tubes 10.

Projections 23 on the gaskets 11 extend laterally beyond the end-plates 13 and 14 so as to form feet for supporting the apparatus, and grooves 24 (see Figure 3) in each end of the gaskets locate the tubes with respect to the rods 18.

The apparatus, in use, is housed in a cold chamber, such as an ice-box. The circulation of the beverage is as follows: It enters from an inlet pipe, (not shown) connected to the conduit 15 at the joint 25, and passes into the conduit 15 which is formed at the top of the end-plate 13. It flows from the conduit 15 into the tubes 10 by way of the holes 21. As the beverage passes along the tubes 10 it is cooled, and the cool liquid settles to the bottom of the tubes and flows from the tubes through the holes 22 into the outlet conduit 16 at the bottom of the end-plate 14. A joint 26 connects the outlet conduit 16 to an outlet pipe (not shown).

It will be seen that the pipes 10 are connected in parallel with the conduits 13 and 14, and that if one of the pipes were broken, the appropriate holes 21 and 22 might be plugged whereby the apparatus could still be used with only three tubes in operation.

Instead of glass tubes it is also possible to use metal tubes for instance of copper or bronze which are cast together to form a single unit.

It will also be seen that by slackening the tension nuts the pipe-connections may readily be dismantled, and any of the tubes may be removed independently while the end-plates and gaskets are supported on the clamping rods.

I claim:—

1. Apparatus for cooling or heating beverages comprising in combination a plurality of tubes through which liquid can flow, a pair of end plates, detachable clamping means for retaining the said end plates in fluid tight contact with the ends of said tubes, conduits disposed longitudinally on said end plates and ports affording communication between said tubes and the conduits, said ports being smaller in cross sectional area than the bores of said tubes.

2. Apparatus for cooling or heating beverages comprising in combination a plurality of tubes through which liquid can flow, a pair of end plates having conduits disposed longitudinally thereon, detachable clamping means for retaining the said end plates in fluid tight contact with the ends of said tubes, ports affording communication between said tubes and the conduits, said ports being smaller in cross sectional area than the bores of said tubes, and liquid inflow and outflow ports to said conduits.

3. Apparatus for cooling or heating beverages comprising in combination a plurality of tubes of equal length, a pair of end plates, conduits formed on said end plates passing longitudinally thereof and clamping means for drawing said end plates together with said tubes between them, their ends abutting upon said plates, and ports affording communication between each of said cubes and the conduits, said ports being smaller in cross sectional area than the bores of said tubes.

4. Apparatus for cooling or heating beverages comprising in combination a plurality of tubes through which liquid can flow, a pair of end plates each having at least one plane face, a gasket supported on each of said plates and detachable clamping means for drawing said end plates together with said tubes between them, the ends of said tubes abutting on the gaskets, a conduit formed on the outer side of each of said end plates, and ports affording communication between said tubes and the conduits, said ports being smaller in cross sectional area than the bores of said tubes.

5. Apparatus for cooling or heating beverages comprising in combination a plurality of tubes, a pair of end plates each having at least one plane face, a gasket on the plane face of each of said end plates, said gaskets comprising a plurality of sockets into which the ends of said tubes may be fitted, clamping means for drawing said end plates together with said tubes between them, whereby fluid tight joints sealed by said gaskets are formed between the ends of said tubes and said end plates, conduits attached to said end plates, and ports affording communication between said tubes and the conduits, said ports being smaller in cross sectional area than the bores of said tubes.

6. Apparatus for cooling or heating beverages, comprising in combination a plurality of tubes through which liquid can flow, a pair of end plates each having at least one plane face, a gasket on the plane face of each of said end plates, said gaskets being flanged so as to form a plurality of sockets into which said tubes may be fitted, tie rods extending between said end plates to draw same together with said tubes between them, conduits attached to said end plates, and ports affording communication between said tubes and the conduits, said ports being smaller in cross sectional area than the bores of said tubes.

7. Apparatus for cooling or heating beverages comprising in combination a plurality of tubes through which liquid can flow, a pair of end plates each having at least one plane face, a gasket on the plane face of each end plate, said gaskets being flanged to form a plurality of sockets into which said tubes may be fitted, clamping means for drawing said end plates together with said tubes between them, means on said gaskets to locate the tubes with respect to the clamping means, conduits attached to said end plates, and ports affording communication between said tubes and the conduits, said ports being smaller in cross sectional area than the bores of said tubes.

8. Apparatus for cooling or heating beverages comprising in combination a plurality of tubes through which liquid can flow, a pair of end plates each having at least one plane face, a gasket on the plane face of each of said end plates, flanges on said gaskets forming sockets into which said tubes may be fitted, tie rods extending between said end plates to draw same together with said tubes between them, projections on said gaskets to engage said tie rods and locate the tubes with respect thereto, conduits on said end plates and ports affording communication between said tubes and the conduits, said ports being smaller in cross sectional area than the bores of said tubes.

9. Apparatus for cooling or heating beverages comprising in combination a plurality of tubes through which liquid can flow, a pair of end plates each having at least one plane face, conduits on said end plates, a gasket supported on the plane face of each end plate, detachable clamping means for drawing said end plates together with said tubes between them, their ends being seated on said gaskets, ports affording communication between said tubes and the conduits and projections on said gaskets projecting laterally beyond the said end plates so as to form feet for supporting the apparatus, said ports being smaller in cross sectional area than the bores of said tubes.

10. Apparatus for cooling or heating beverages comprising in combination a plurality of tubes through which liquid can flow, a pair of end plates each of which has at least one plane face, conduits on said end plates, a gasket on the plane face of each of said end plates, said gaskets being flanged so as to form sockets into which said tubes may be fitted, tie rods for drawing said end plates together with said tubes between them, ports affording communication between said tubes and the conduits, and projections on said gaskets extending laterally beyond the said end plates so as to form feet for supporting the apparatus, said ports being smaller in cross sectional area than the bores of said tubes.

FREDERICK JOHN TREVALLON BARNES.